United States Patent [19]

Munemasa et al.

[11] Patent Number: 5,764,801
[45] Date of Patent: Jun. 9, 1998

[54] DECODING SYSTEM AND METHOD OF CODED DATA BY PARALLEL PROCESSINGS

[75] Inventors: Narihiro Munemasa, Chigasaki; Haruo Takeda, Kawasaki, both of Japan

[73] Assignee: Hitachi, Ltd., Tokyo, Japan

[21] Appl. No.: 364,784

[22] Filed: Dec. 27, 1994

[30] Foreign Application Priority Data

Dec. 27, 1993 [JP] Japan .................................. 5-330520

[51] Int. Cl.⁶ .............................. G06K 9/36; G06K 9/46
[52] U.S. Cl. .................... 382/234; 382/233; 382/304
[58] Field of Search .............................. 382/233, 234, 382/304, 232, 235, 246; 364/715.02

[56] References Cited

U.S. PATENT DOCUMENTS

| | | | |
|---|---|---|---|
| 4,837,634 | 6/1989 | Hisada | 358/409 |
| 5,212,742 | 5/1993 | Normille et al. | 382/234 |
| 5,379,070 | 1/1995 | Retter et al. | 348/403 |
| 5,465,305 | 11/1995 | Ueno | 382/304 |
| 5,475,770 | 12/1995 | Mittelbach et al. | 382/304 |
| 5,504,823 | 4/1996 | Yoon | 382/233 |

*Primary Examiner*—Leo H. Boudreau
*Assistant Examiner*—Bhavesh Mehta
*Attorney, Agent, or Firm*—Antonelli, Terry, Stout & Kraus, LLP

[57] ABSTRACT

A method for decoding coded data is executed to use a decoder composed of plural decoding units, those units being parallel processors. The coded data is divided into a first and a second coded areas. A first decoding unit starts to decode the coded data from the head of the first coded area, that is, from the head of the overall coded data. A second processor starts the decoding process from the head of the second coded area, that is, from any location of code sequence from the head. If conflict takes place in the decoded data, the decoding device operates to repeat a trial-and-error operation for re-starting the decoding process from a new location close to the head of the second coded area. When the decoding process of the first decoding unit reaches the second coded area, if a right answer is found in the decoded result given by the second decoding process, it is picked up as the proper result.

5 Claims, 12 Drawing Sheets

```
TABLE ENTRY
─────────────
    20025
```
                                                    200

| CODE DELIMITER | DATA | ATTRIBUTE | VALUE |
|---|---|---|---|
| 0 | Y | DC | 9 |
| 8 | Y | AC | 6 |
| 14 | Y | AC | 4 |
| 20 | Y | AC | 0 |
| 24 | Y | AC | 7 |
| 30 | Y | AC | 5 |
| ⋮ | ⋮ | ⋮ | ⋮ |

300

| NO MORE | DC CORRECT | TABLE 2 ENTRY | MAX CODE POINT |
|---|---|---|---|
| OFF | ON | 25511 | 152455 |

| CODE DELIMITER | DATA ATTRIBUTE | | VALUE |
|---|---|---|---|
| 105021 | Y | DC | 1 |
| 105025 | Y | AC | 8 |
| 105033 | Y | AC | 10 |
| 105039 | Y | AC | 12 |
| 105043 | Y | AC | 9 |
| 105053 | Y | AC | 11 |
| ⋮ | ⋮ | ⋮ | ⋮ |

DECODING SYSTEM AND METHOD OF CODED DATA BY PARALLEL PROCESSINGS

BACKGROUND OF THE INVENTION

Field of the Invention

The present invention relates to an image processing system which is suitable for use with image-relevant devices, such as a workstation, a wordprocessor device, a facsimile, a printer, and a copier, and, more particularly, the invention relates to a decoding system and method which is appropriate for use in decoding compressed data, such as a coded digital color image. Description of the Related Art.

The JPEG (Joint Photographic Coding Experts Group) system has been proposed as an international standard for a compressing system for coding a color still image. The JPEG is roughly divided into two compressing types. The first type employs a DCT (Discrete Cosine Transform) technique. This technique is referred to as a fundamental type of JPEG, which is arranged to quantize data and eliminate high-frequency components of an image. It is irreversible in restoring image data, but realizes a high compression ratio as a means for maintaining the image quality. The second type of JPEG employs a DPCM (Differential Pulse Coded Modulation) technique. This type is reversible in restoring a coded image. It makes it possible to completely restore an original image, though it has a small compression ratio. The DCT technique is divided into a Baseline system, which is an essential function and an Extended system, which is an optional function. The Baseline system is a minimum function, so that the system is required to be loaded in any coding/decoding device of the JPEG. At the final stage of the coding process, a Huffman coding operation is executed. The Extended system is an optional function which is prepared for a more wide range of applications. At the final stage of this coding process, an arithmetic coding is executed. In practice, the Baseline system makes it possible to offer a sufficient performance for almost all applications.

The function specification (ISO DIS 10918-1 REQUIREMENTS AND GUIDELINES) of the JPEG states that a restart marker code (RETm:m=0 to 7) is permitted to be inserted in the coded data. In principle, the data coded according to the JPEG (referred to as JPEG-coded data) is required to be sequentially decoded from the head of the code when the data is decoded. If the restart marker code is inserted into the coded data, the location of the restart marker code is detected in the coded data so that the decoding may be executed from the detected location. If, therefore, the restart marker code is used, re-synchronization is made possible when a transmission error for the coded data takes place and parallel coding/decoding can be achieved.

SUMMARY OF THE INVENTION

The JPEG is not specified to insert the restart marker code at any time. It is hence impossible to adopt a decoding technique presumed on the use of the restart marker code in the data to be decoded, because the JPEG-coded data to be inputted to the decoder is not specified in advance.

For the Baseline system, for example, the decoding process includes the steps of Huffman-decoding, reverse-quantizing, IDCT, and YUV-to-RGB conversion. Of these steps, the reverse-quantizing, the IDCT, and the YUV-to-RGB conversion process the obvious location of the data to be processed in the image space and the defined number of data items, so that those operations process data quite independently. Hence, these operations are executed easily on the data sequence being processed. This means that these operations can be easily carried out in parallel. On the contrary, in principle, the Huffman decoding operation makes it impossible to decode the data sequence along the code sequence without any restart marker code RSTm. Hence, for example, if a color printer having a parallel processor uses a parallel processing for a decoding portion of the JPEG-coded data for speeding up the processing operation, the Huffman decoding to be done for the first time represents a bottleneck to the color printer. An important factor to speeding up the operation is an efficient Huffman decoding.

It is an object of the present invention to provide a decoding system and a method of the coded data which are capable of parallelizing the decoding process with respect to the coded data, such as the JPEG, the MH, the MMR, and other variable-length Huffman coded data, the coded data being permitted to be decoded only from the head of the code sequence.

The method of decoding coded data using decoders composed of plural decoding portions of parallel processors according to the present invention takes the steps of dividing the coded data into a first coded area and a second coded area, starting the decoding from the head of the first coded area, that is, the head of all the coded data to be decoded in a first decoding portion, and activating a second processor to start the decoding from the head of the second coded area, that is, from any location of the coded data except the head. The second decoding portion repeats a trial-and-error process of restarting the decoding from the new location close to the head of the second coded area if a conflict takes place in the decoded data. When the decoding process of the first decoding portion reaches the second coded area, if a correct answer is found in the decoded result given by performing the decoding process of the second processing portion, the correct portion is used as the decoded result.

For the JPEG-coded data, the conflict of the decoded data is presumed to be no code found in the Huffman table, the appearance of more AC components than the necessary number, for example. For the HM coded data or other variable-length Huffman coded data, the conflict is presumed to be a mismatch between the width of a restored image and the restored result, for example.

Further, to make the description simple, the above-noted arrangement provides two decoding portions. However, this function, in principle, holds true for an arrangement having more decoding portions than two.

According to the present invention, the processor powers of the decoders are effectively used for the coded data being allowed to be decoded only from the head of the code sequence.

DESCRIPTION OF THE PREFERRED EMBODIMENTS

Figure 1:
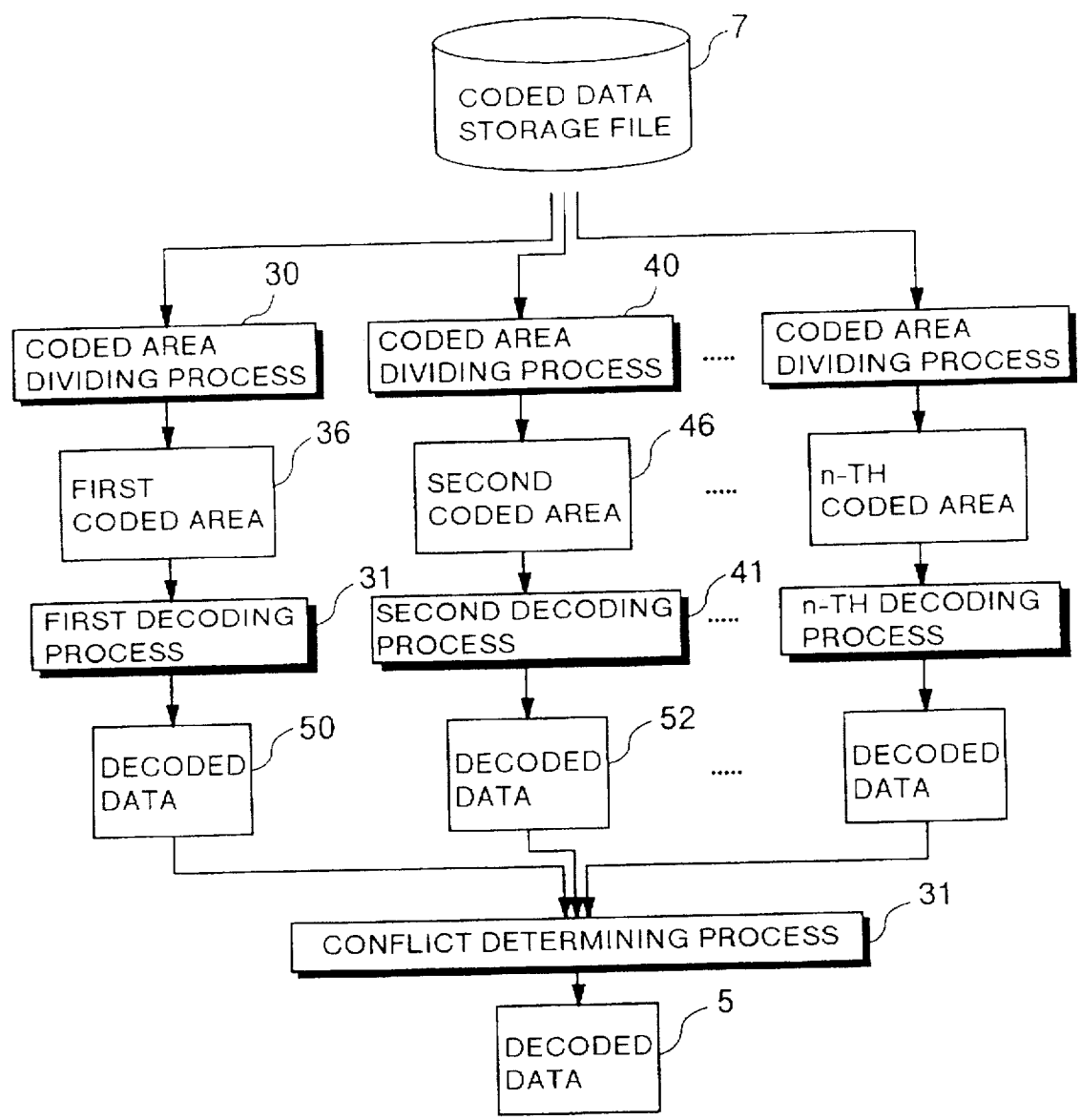
FIG. 1 is a block diagram showing a fundamental concept of a decoding method according to the present invention.

FIG. 1 is a block diagram illustrating a basic concept of the present invention. Coded data 7 to be decoded is divided into plural coded areas (This holds true for processes 30,40, ... ), each of which is stored in a corresponding area 36, 46, ... of a memory. The coded data in the corresponding area is decoded in parallel by plural decoders (This holds true fir processes 31, 41, ... ). The decoded results produced by the decoders are stored in the corresponding memories 50, 52, ... If no conflict takes place in the content of each memory (process 31), the results are adopted as correct results.

Figure 2:
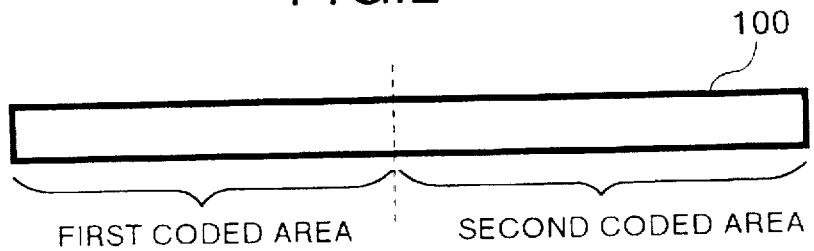
FIG. 2 is a diagram showing a summary of a decoding method according to the present invention.

FIG. 2 shows a summary of the process to be executed by the present invention. A numeral 100 represents JPEG-coded data of one picture stored in a JPEG-coded data storage file 7. In accordance with this invention, the coded data 100 is divided into two areas, which are referred to as a first coded area and a second coded area, respectively. To make the description simple, the arrangement of this embodiment provides two processors. If n processors are provided in the device, the coded data 100 may be divided into the same number of coded areas as the number of available processors. A first processor starts the Huffman decoding process from the head of the first coded area, that is, the overall coded data to be coded. The first processor operates to store the Huffman-decoded result in a first common table 50.

A second processor performs the Huffman decoding process of the second coded area in parallel with the Huffman decoding process being performed by the first processor. The second processor starts the decoding process from the head of the second coded area, which is not guaranteed to be the correct decode-starting location. Hence, some conflict may take place in the decoded data. If a conflict takes place in the decoded data, the second processor re-starts the decoding process from a new location close to the head of the second coded area. The Huffman decoding process executed by the second processor is a process of repeating such a trial-and-error operation and storing the decoded result in a second common table 52.

When the Huffman decoding process terminates the processing of the first coded area and reaches the second coded area, the first processor determines whether or not a correct answer has been found in the result 52 decoded by the second processor. If yes, the correct portion is used as the decoded result. If no, the first processor starts to process the Huffman decoding of the second coded area after the first coded area. Further, when the process of using the result decoded by the second processor catches up with the actual Huffman decoding process done by the second processor, the first processor operates to execute the Huffman decoding process with respect to the remaining portion, that is, the portion of the second coded area for which the second processor still has not executed the Huffman decoding.

Figure 3:
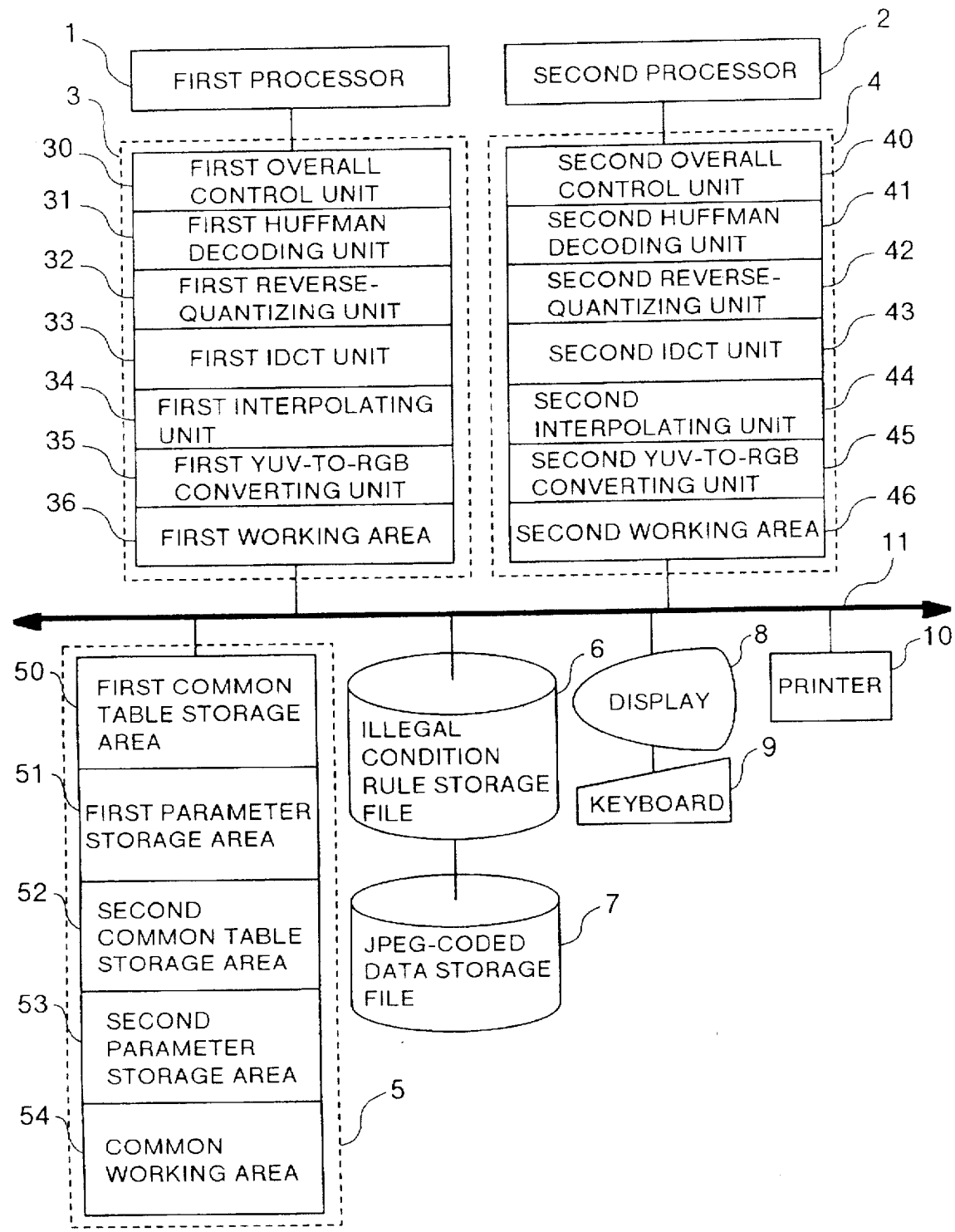
FIG. 3 is a block diagram showing one device arrangement for embodying the present invention.

FIG. 3 is a block diagram showing a hardware arrangement of an image retrieving machine to which the present invention applies. The image retrieving machine includes the first processor 1, the second processor 2, a local memory 3 used by the first processor 1, a local memory 4 used by the second processor, a shared memory 5 used by all the processors, an illegal condition rules storage file 6 for registering a regulated illegal decoded condition, a JPEG-coded image data storage file 7 for storing the JPEG-coded image data, a display 8 for displaying image data or the like, a keyboard 9 for entering commands or the like, a printer 10 for printing image data or the like, and a bus 11 for interconnecting these elements with each other.

The local memory 3 includes a first overall control unit 30 for storing a program routine for controlling the overall process executed by the first processor, a first Huffman decoding unit 31 for storing a predetermined Huffman table and a program routine for decoding Huffman codes, a first reverse-quantizing unit 32 for storing a predetermined quantizing table and a program routine for performing a reverse-quantizing operation, a first IDCT unit 33 for storing a program routine for performing an inverse DCT process, a first interpolating unit 34 for storing a program routine for interpolating thin-out W data, a first YUV-to-RGB converting unit 35 for storing a program routine for performing conversion of data from YUV to RGB, and a first working area 36. The local memory 4 includes a second overall control unit 40 for storing a program routine for controlling an overall process to be executed by the second processor, a second Huffman decoding unit 41 for storing a predetermined Huffman table and a program routine for decoding Huffman codes, a second reverse-quantizing unit 42 for storing a predetermined quantizing table and a program routine for performing a reverse-quantizing operation, a second IDCT unit 43 for storing a program routine for performing an inverse DCT operation, a second interpolating unit 44 for storing a program routine for interpolating thin-out W data, a second YUV-to-RGB converting unit 45 for storing a program routine for performing conversion of data from YUV to RGB, and a second working area 46 serving as a working area used by the second processor. Further, the shared memory 5 includes a first common table storage area 50 for storing a result processed by the first Huffman decoding unit 31, a first parameter storage area 51 for storing various parameters with respect to the first common table, a second common table storage area 52 for storing the result processed by the second Huffman decoding unit 41, a second parameter storage area 53 for storing various parameters with respect to the second common table, and a working area 54 shared by all the processors.

Figure 4:
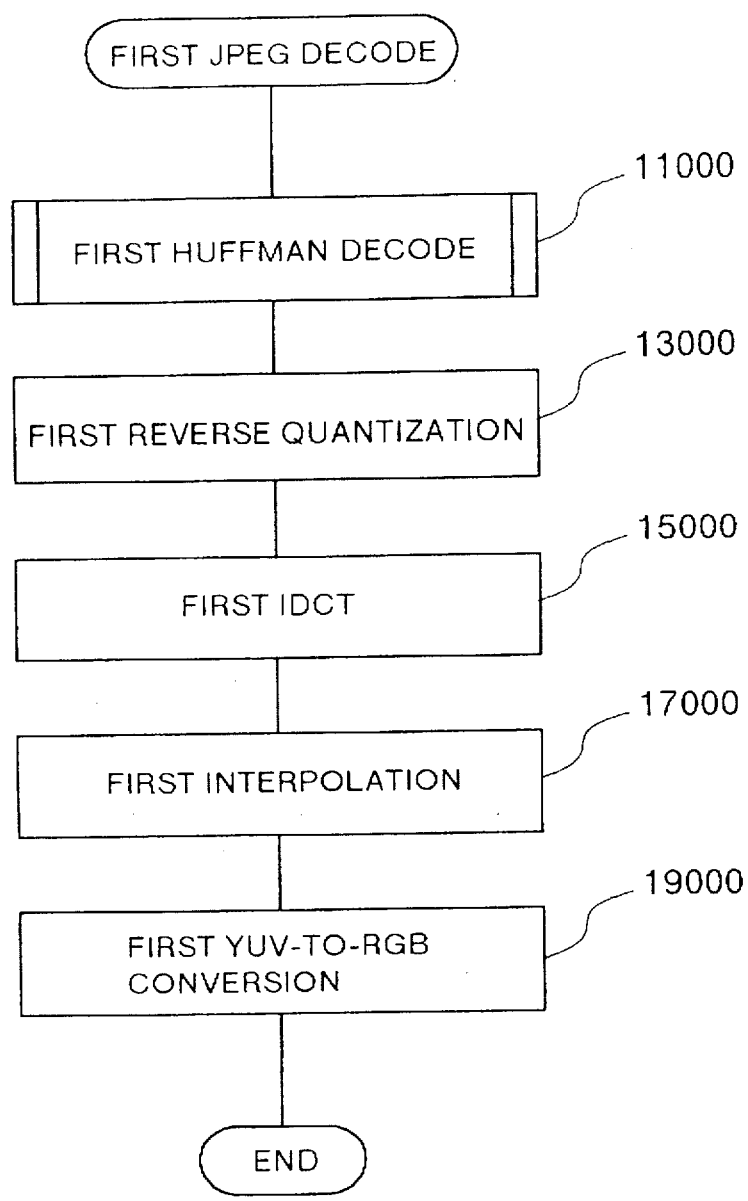
FIG. 4 is a basic flowchart showing a first JPEG decoding process executed by a first processor.

FIG. 4 is a basic flowchart showing the first JPEG decoding process to be executed by the first processor 1. The first JPEG decoding process operates to process the JPEG-coded data (first coded area) divided by the first overall control unit 30. If two processors are provided as described by way of example for this embodiment, this division is a simple process of properly halving the coded data into first and second parts and specifying the first part as the first coded area. At a step 11000, the Huffman decoding operation is executed from the first coded area of the coded data loaded to the first working area 36, that is, the head of the coded data, and the result is stored in the first common table storage area 50. At a step 13000, among all the Huffman-decoded results stored in the first and the second common table storage areas 50 and 52, the result specified by the first overall control unit 30 is reverse-quantized and then is stored in the first working area 36. At a step 17000, among the IDCT-processed data stored in the first working area 36, the data portion specified by the first overall control unit 30 is interpolated with respect to its W data. The interpolated data is stored in the first working area 36. At a step 19000, among the interpolated data, the data portion specified by the first overall control unit 30 is subject to YUV-to-RGB conversion. The converted result is stored in the first working area 36.

Figure 5:
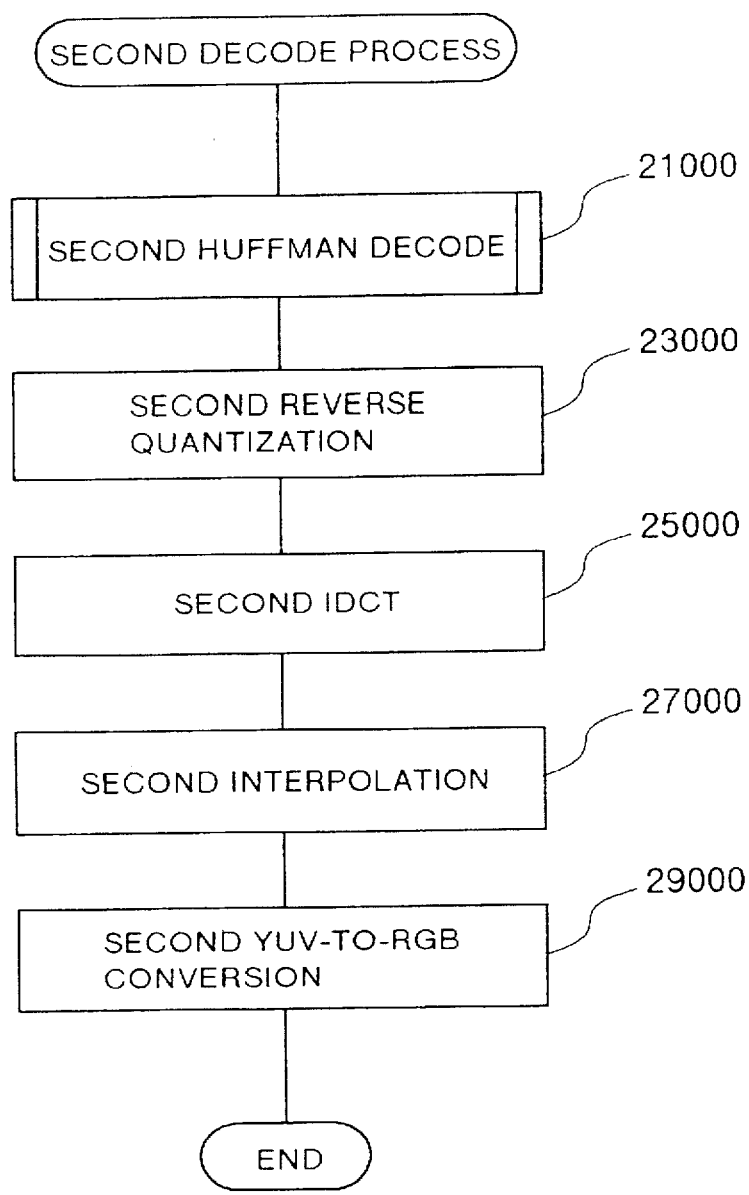
FIG. 5 is a basic flowchart showing a second JPEG decoding process executed by a second processor.

FIG. 5 is a basic flowchart showing a second JPEG decoding process to be executed by the second processor 2. The second JPEG decoding process operates to process the JPEG-coded data (second coded area) divided by the second overall control unit 40. In this embodiment, the second coded area is the second half of the coded data. At a step 21000, the Huffman decoding operation is executed from the second coded area of the coded data loaded to the second working area 46, that is, from any location of the coded data sequence except the head. At a step 23000, among all the Huffman-decoded results loaded in the first and the second common table storage areas 50 and 52, the result specified by the second overall control unit 40 is reverse-quantized and then is stored in the second working area 46. At a step 25000, among the reverse-quantized data stored in the second working area 46, the data portion specified by the second overall control unit 40 is subject to the IDCT process and then the processed data is stored in the second working area 46. At a step 27000, among the data stored in the second working area 46, the data portion specified by the second overall working unit 40 is interpolated with respect to its W data. The interpolated result is stored in the second working area 46. At a step 29000, among the interpolated data stored in the second working area 46, the portion specified by the second overall control unit 40 is YUV-to-RGB-converted and then is stored in the second working area 46.

In the foregoing description with reference to FIGS. 4 and 5, the data portion specified by the i-th overall control unit (i=1 or 2) is formed by properly halving all the blocks composing a picture and specifying the i-th (i=1 or 2) divided portion as the object to be processed if just two processors are provided as proposed in this embodiment. If n processors are provided (i=1 to n), all the blocks composing a picture are properly divided into n parts and the i-th (i=1 to n) divided portion is specified as the object to be processed.

In addition, in the description referring to FIGS. 4 and 5, the processing contents of the reverse-quantizing unit, the IDCT unit, the interpolating unit, and the YUV-to-RGB converting unit follow the function specifications of the JPEG (ISO DIS 10918-1 REQUIREMENT AND GUIDELINES).

Figure 6:
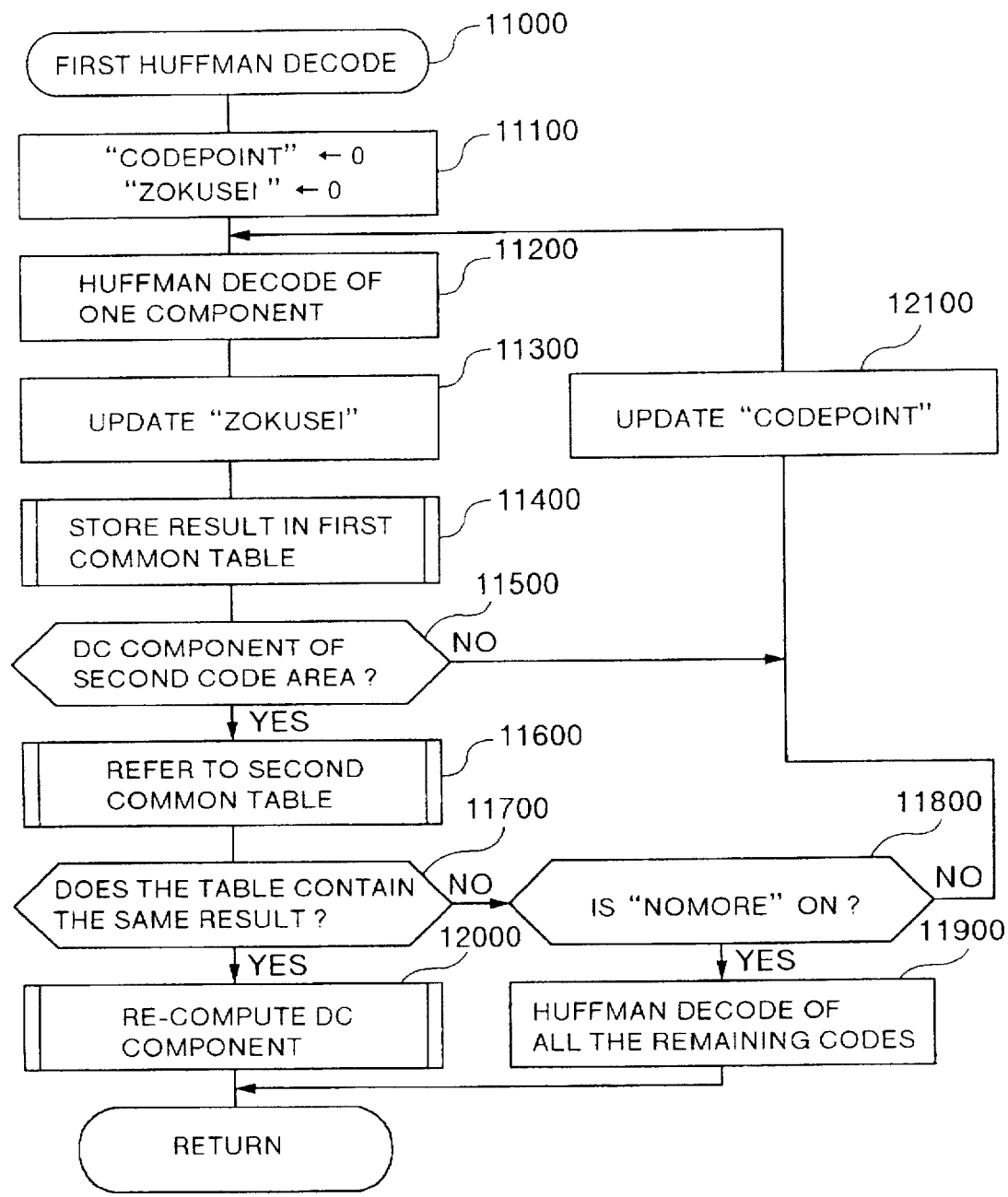
FIG. 6 is a flowchart showing details of a first Huffman decoding process 11000.

FIG. 6 is a flowchart showing details of the first Huffman decoding operation executed at the step 11000. In executing the step 11000, an operation is executed in step 11100 to initialize a variable CodePoint for storing a bit location of coded data to be processed next and a variable Zokusei for storing attribute information such as Y (luminance), W (color difference) and DC (direct current components) of a Huffman-decoded result. At step 11200, one component is Huffman decoded. At a step 11300, according to the result processed at the step 11200, the attribute information is stored to the Zokusei. At a step 11400, the CodePoint and Zokusei are stored in a first common table 300 located in the first table storage area 50 as a code delimiter and data attribute. The first common table 300 will be discussed in detail later. At a step 11500, it is determined whether or not the result decoded at the step 11200 is a DC component of the second coded area. If not, at a step 12100, the variable CodePoint is updated. Then, the CodePoint is updated at step 12100 and the operation returns to the step 11200. At a step 11600, the referring operation is executed to determine whether or not the second common table 500 located in the second common table storage area 52 has the same result as the result stored in the first common table at the step 11400. If yes (the data will be referred to as hit data), the operation goes to the step 12000. At the step 12000, a re-computation of the DC component is executed with respect to the Huffman-decoded data stored in the hit data or later of the second common table 500. The second common table 500 will be discussed in detail later. If the same result is not found during the referring operation at the step 11600, the operation goes to a step 11800. At this step, it is determined whether or not a parameter NoM ore stored in the second parameter storage area 53 is on. The parameter NoMore indicates that the first Huffman decoding unit is decoding coded data located later than that to be decoded by the second Huffman decoding unit (that is, the first Huffman decoding has overtaken the decode location of the second Huffman decoding). If the parameter NoMore is on, at a step 11900, the remaining coded data is Huffman-decoded. The decoded result is stored in the first common table 300. If the parameter NoMore is off, at a step 12100, the variable CodePoint is updated. Then, the operation returns to the step 11200.

Figures 7A, 7B, 8:
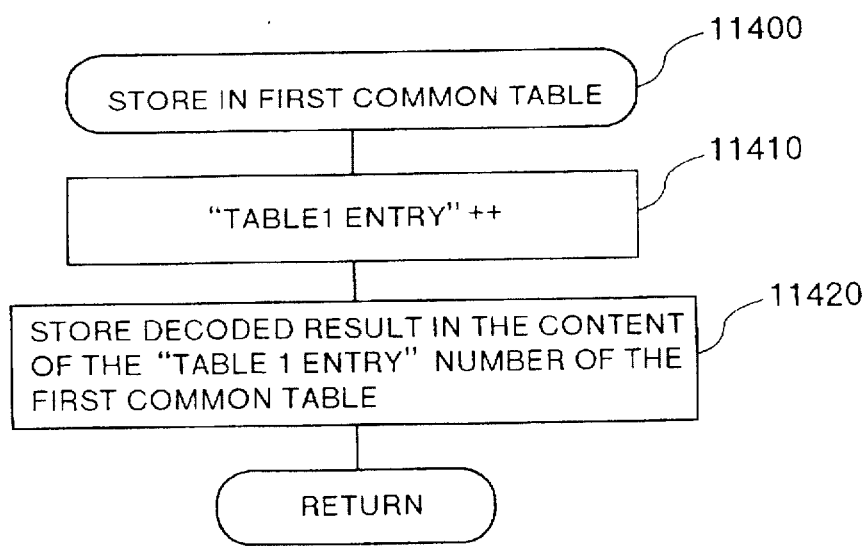
FIG. 7A is a diagram showing a first common table.
FIG. 7B is a table showing details of a first parameter.
FIG. 8 is a flowchart showing details of a storing process 11400 to the first common table.

FIG. 7B illustrates the first common table 300 stored in the first common table storage area 50. FIG. 7A illustrates a first parameter 200 for storing parameters about the first common table stored in the first parameter storage area 51. In the first common table 300, the item "code delimiter" is used for storing a value of the CodePoint (the head bit location of a Huffman code) appearing when Huffman decoding is performed at the step 11200. The item "data attribute" is used for storing a value of Zokusei (attributes such as luminance, color difference, d.c. components and a.c. components of decoded data). The item "value" is used for storing values of the d.c. components and the a.c. components. For example, the third entry of the first common table 300 indicates that the code head is at the 14th bit of the coded data, its data contains a.c. components of luminance, and its value is 4. The member "Table 1 Entry" of the first parameter 200 is used for storing a last entry number (address) of the first common table 300.

FIG. 8 is a flowchart showing details of the storage to the first common table at the step 11400. At the step 11410, the member of Table 1 Entry stored in the first parameter storage area 51 is incremented by 1. At a step 11420, the Huffman-decoded result given at the step 11200 is stored in the number of the "Table 1 Entry" of the first common table 300.

Figure 9A:
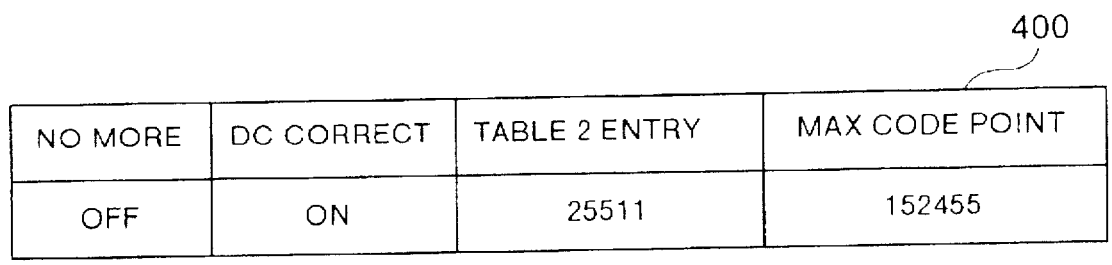
FIG. 9A is a diagram showing a second common table.
Figure 9B:
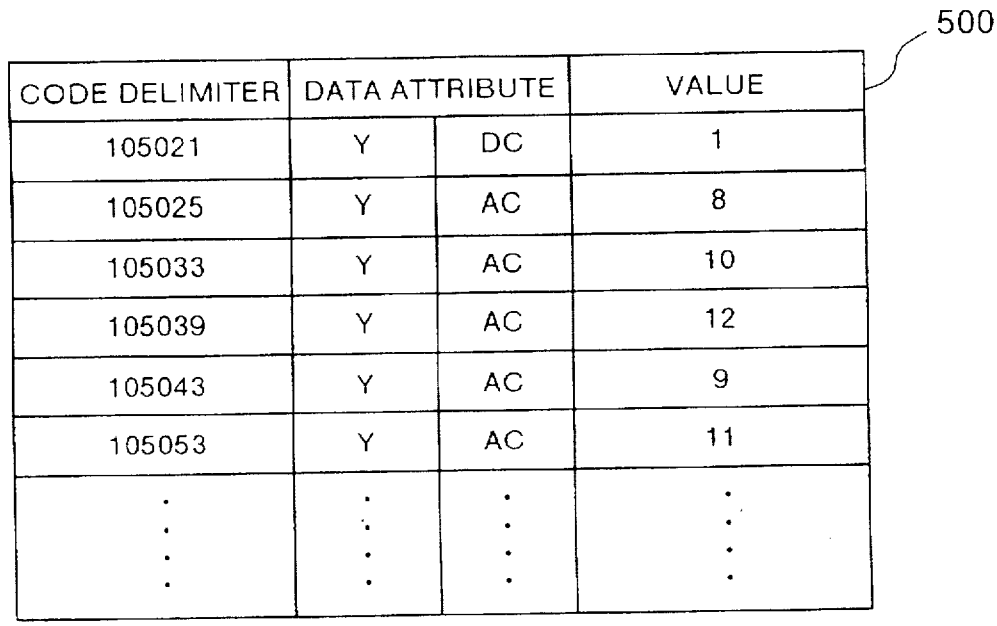
FIG. 9B is a table showing details of a second parameter.

FIG. 9B shows the second common table 500 stored in the second common table storage area 52. FIG. 9A shows the second parameter 400 for storing a parameter about the second common table stored in the second parameter storage area 53. In the second common table, the item "code delimiter" stores values of the CodePoint (head bit location of the Huffman code) provided at the time of the Huffman decoding at a step 21200 (to be described later with reference to FIG. 12). The item "data attribute" stores values of Zokusei (attributes such as luminance, color difference, d.c. components and a.c. components of decoded data). The item "value" stores values of the d.c. components and the a.c. components. For example, the third entry of the second common table 500 indicates that the code head is located at the 105033th bit of the coded data, the data contains the a.c. components of luminance, and the value is 10. The member "NoMore" of the second parameter 400 indicates that the first Huffman decoding unit is decoding coded data located later than that to be processed by the second Huffman decoding unit (the first Huffman decoding has passed the last decode location of the data to be subjected to the second Huffman Decoding) if the member "NoMore" is on. The second parameter 400 has a member "DCCorrect" which indicates that the DC component value in the second common table 500 is not a differential value but a real value. The second parameter 400 also has a member "Table 2 Entry" which stores the last entry number (address) of the second common table. The second parameter 400 has a member "MaxCodePoint" which stores a maximum value of the item "code delimiter" of the second common table 500.

Figure 10:
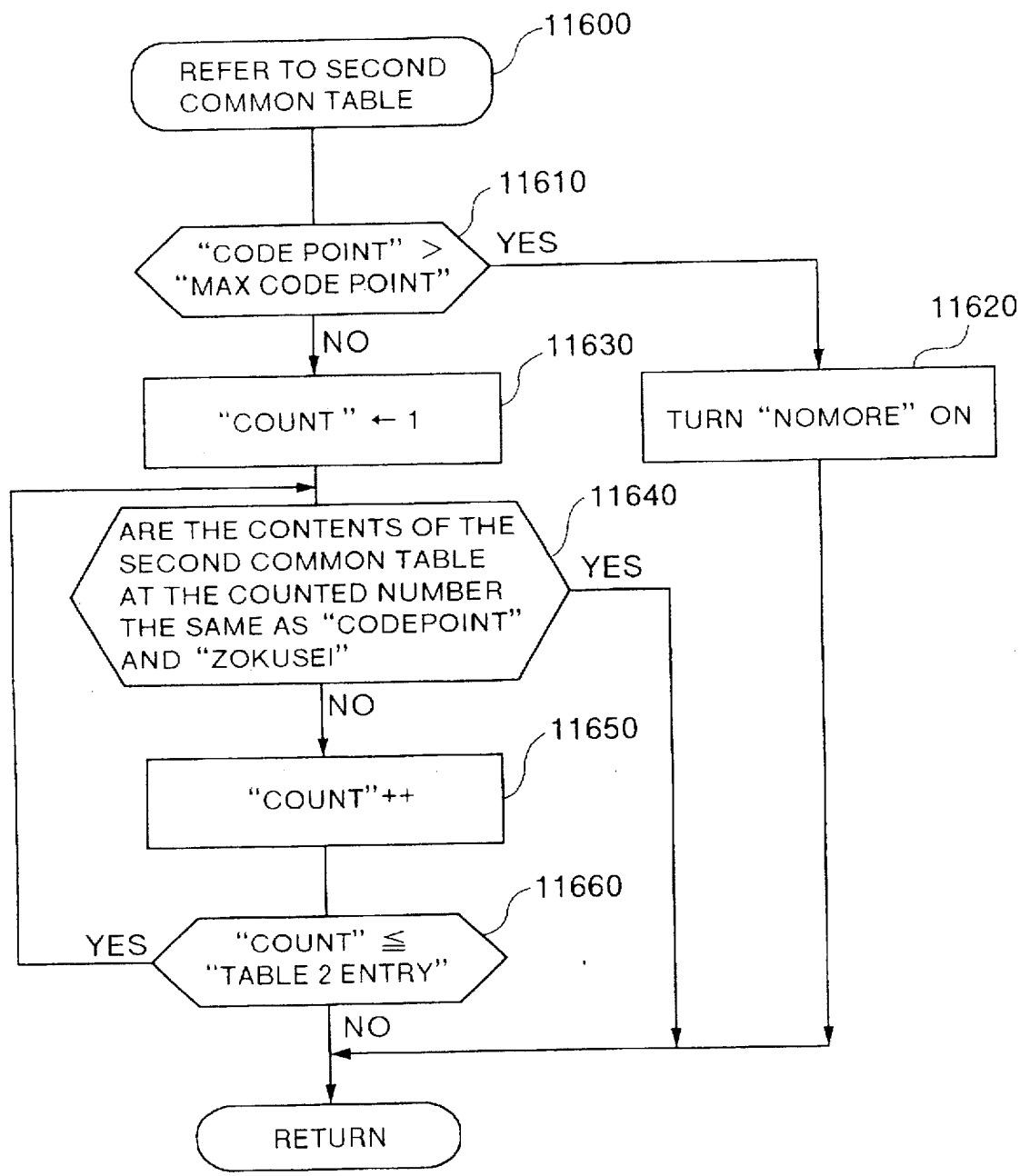
FIG. 10 is a flowchart showing detail of a referring process 11600 to the second common table.

FIG. 10 is a flowchart showing details referring to the second common table at the step 11600. At a step 11610, the CodePoint is compared with the MaxCodePoint. If Codepoint>MaxCodePoint (the first Huffman decoding has passed the last decoding location of the data to be subjected to the second Huffman decoding), at a step 11620, the parameter NoMore is turned on. If CodePoint<MaxCodePoint, at a step 11630, a counter Count is initialized to a value of 1. At a step 11640, it is determined whether or not the entry content of the second common table 500 at the counted number is equal to the CodePoint and the Zokusei. If yes, the referring process to the second common table 500 is terminated. If no, at a step 11650, the counter Count is incremented by 1. Then, the operation goes to a step 11660. At this step, the value of the Count is compared with the value of the Table 2 Entry. If Count≦ Table 2 Entry, the operation returns to the step 11640. If Count>Table 2 Entry, the referring process to the second common table 500 is terminated.

Figure 11:
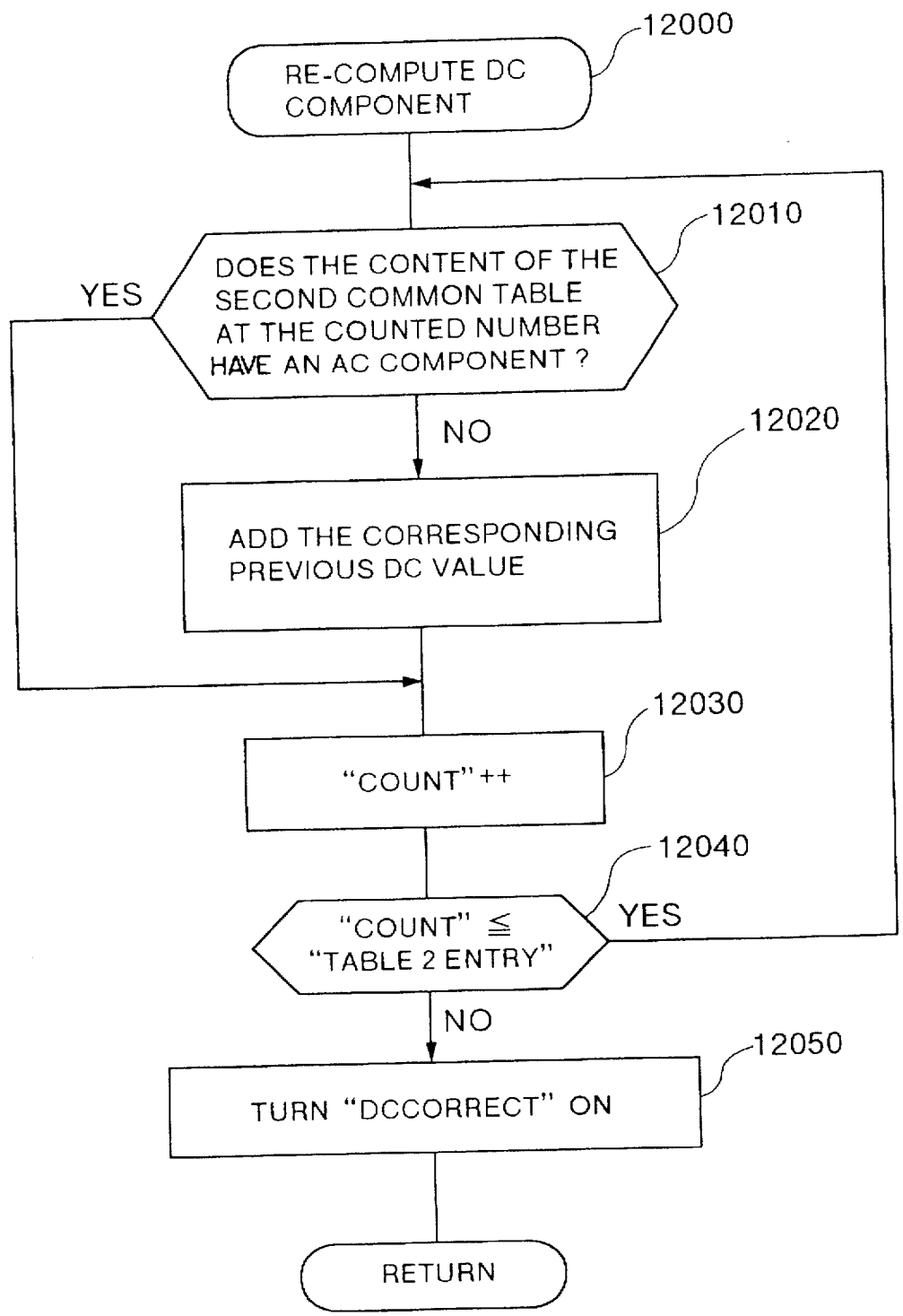
FIG. 11 is a flowchart showing details of a DC component re-computing process 12000.

FIG. 11 is a flowchart showing details of the recomputing of DC components at the step 12000. At a step 12010, it is determined whether or not the entry content of the second common table at the counted number is an AC component. If not (that is, it is a DC component), at step 12020 the DC value derived as a differential value is converted into a real value by adding the corresponding previous DC value. At a step 12030, the counter Count is incremented by 1. Then, the operation goes to a step 12040. At this step, if Count≦ Table 2 Entry, the operation goes to the step 12010. If Count>Table 2 Entry, the operation goes to a step 12050. At this step, the parameter DCCorrect is turned on in order to indicate that the DC component of the second common table is converted from a differential value to a real value.

Figure 12:
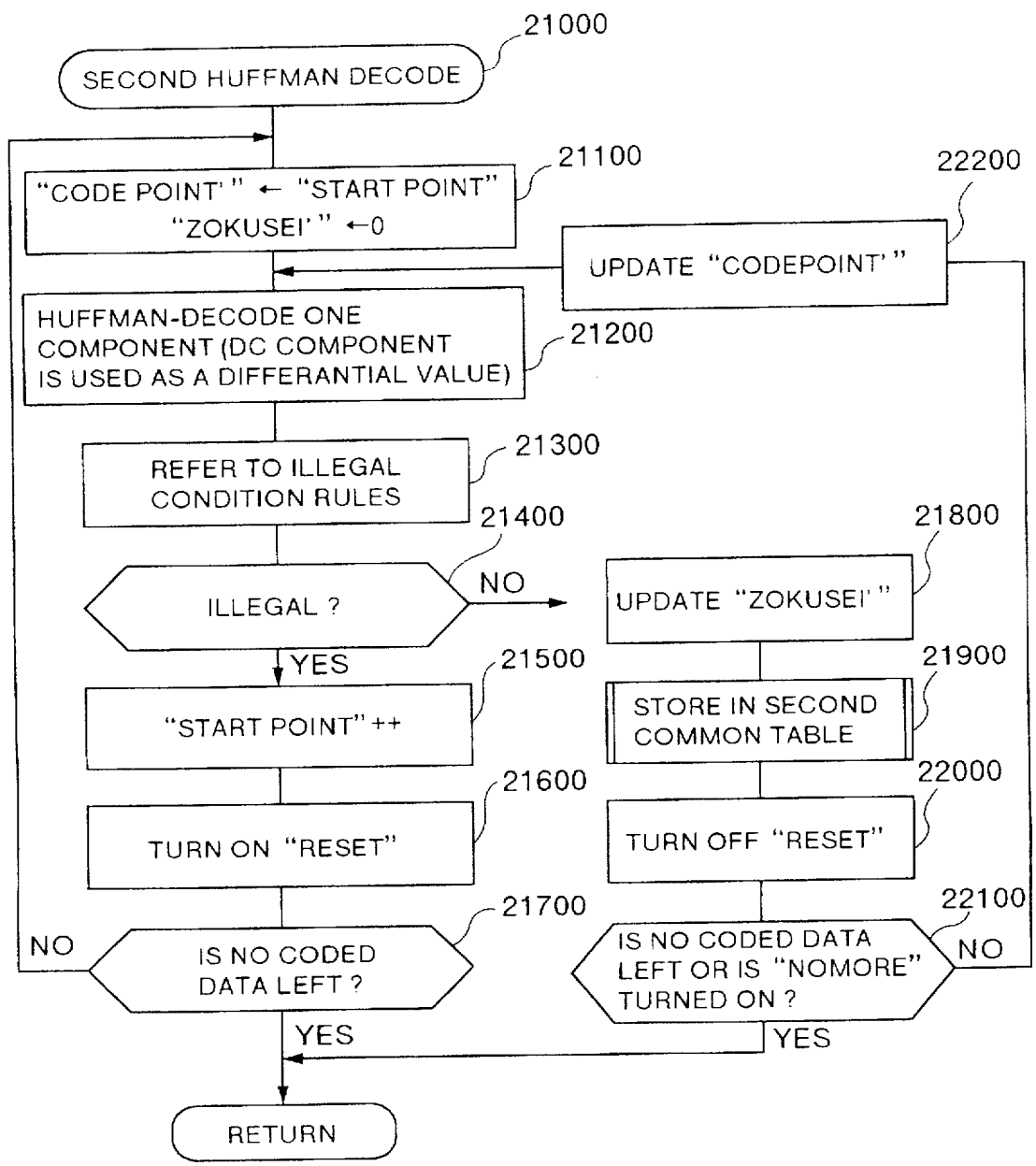
FIG. 12 is a flowchart showing details of a storing process 21900 to the second common table.

FIG. 12 is a flowchart showing details of the second Huffman decoding process to be executed at the step 21000. At a step 21100, the operation is executed to initialize the variable CodePoint for storing the bit location of the coded data to be processed next and the variable Zokusei for storing attribute information such as Y (luminance), UV (color difference), DC (direct current component) and AC (alternate current) of the Huffman-decoded result. The initial value StartPoint of the variable CodePoint is the first bit location of the second coded area. At a step 21200, the Huffman decoding of one (DC or AC) component is executed according to the predetermined Huffman Table. At this time, the DC component is kept as differential data. At a step 21300, it is checked whether or not the decoding process is valid according to the rules for determining whether or not the decoded data is rational, those rules being stored in the illegal condition rule storage file 6. At a step 21300, if the decoding process is found to be illegal, then at a step 21500, the StartPoint is incremented by 1. Then, the parameter Reset is turned on in order to indicate that a rationality is present in the decoded data. At a step 21700, the operation is executed to determine whether or not any coded data to be decoded is left with respect to the new decode start point StartPoint. If yes, the operation returns to the step 21100. If no, the second Huffman decoding process is terminated. If the decoded data is not rational at the step 21300, the operation goes to a step 21800, at which the attribute information is stored in the Zokusei. At a step 21900, the informations stored in the variables CodePoint and Zokusei are stored in the second common table 500 located in the second common table storage area 53. At a step 22000, the parameter Reset is turned off. At a step 22100, when no coded data to be decoded is left or the parameter NoMore is turned on, the second Huffman decoding process is terminated. At any other time, at a step 22200, the variable CodePoint is updated. Then the operation returns to a step 21200.

Figure 13:
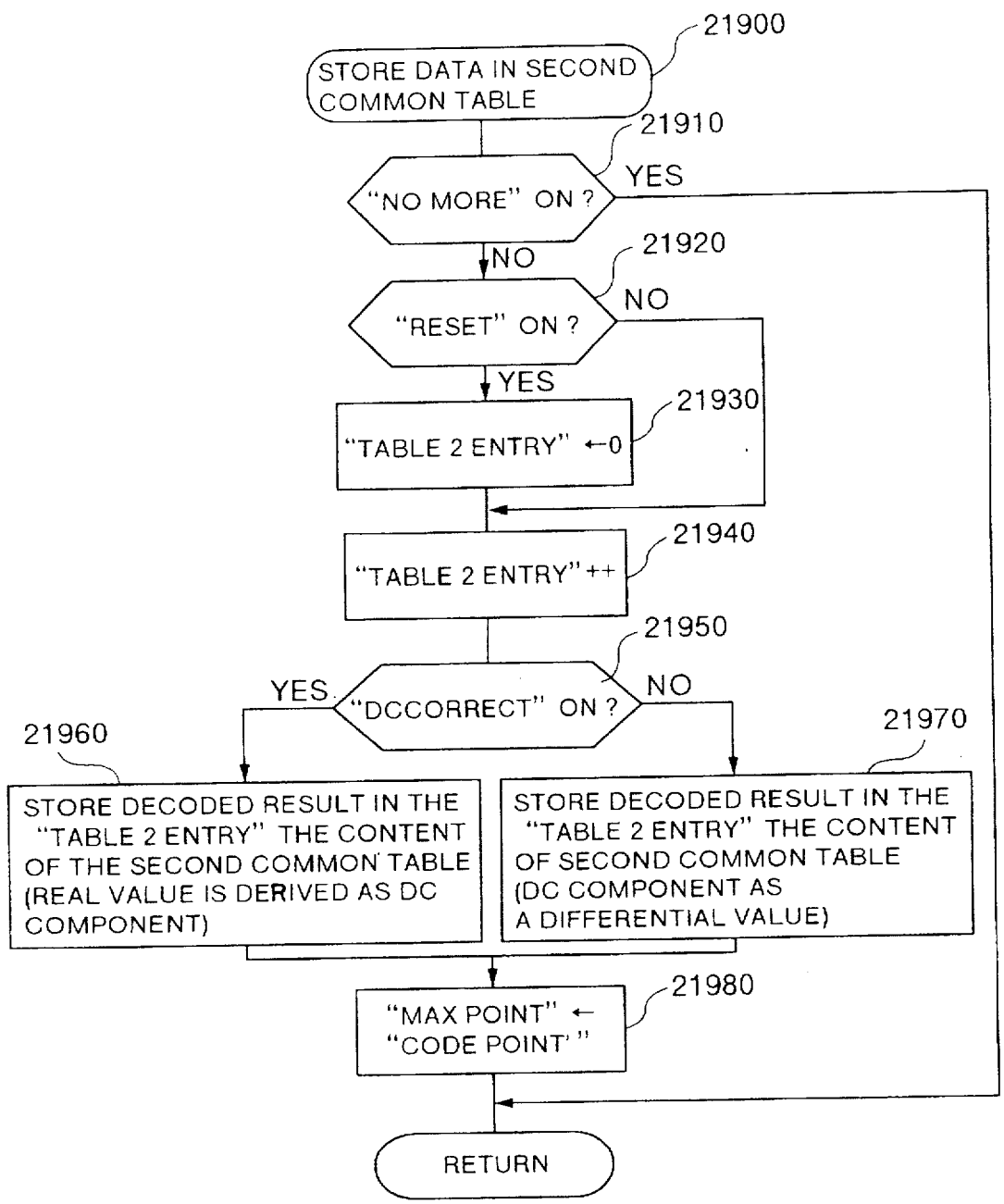
FIG. 13 is a flowchart showing details of a storing process 21900 to the second common table.

FIG. 13 is a flowchart showing details of the storage of the variable in the second common table 500 at the step 21900. At a step 21910, if the parameter NoMore is turned on, the storage of the variable in the second common table is terminated. At a step 21920, if the parameter Reset is turned on, the Table 2 Entry is initialized to zero. At a step 21940, the Table 2 Entry is incremented by 1. At a step 21950, if it is found that the parameter Dccorrect is turned on, at a step 21960, the Huffman decoded result at the step 21200 is stored in the entry content at the "Table 2 Entry"th number of the second common table 500. If the DC component is stored as the result, the corresponding previous DC component is added to the result for deriving a real value and storing it. At a step 21950, if it is found that the parameter DCCorrect is off, at a step 21970, the Huffman-decoded result at the step 21200 is stored in the entry content of the "Table 2 Entry"th number of the second common table 500. If the DC component is stored as the result, the differential value of the DC component is stored therein. At a step 21980, the value of CodePoint is stored in the parameter MaxcodePoint.

Figure 14:
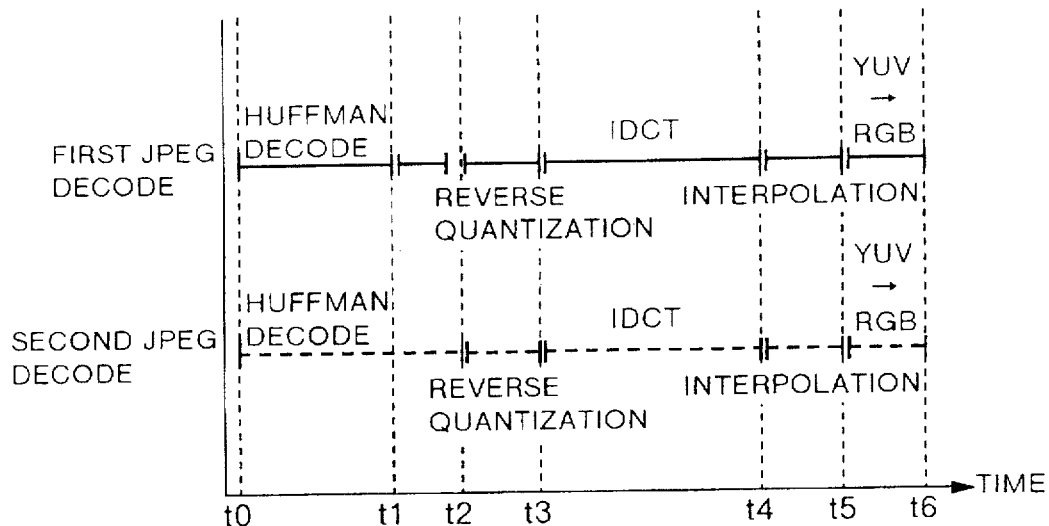
FIG. 14 is a chart showing an example of the first and the second JPEG decoding processes.

FIG. 14 is a chart showing the first and the second JPEG decoding processes with respect to a time axis. At a time t0, the first JPEG decoding process starts to decode the first coded area, while the second JPEG decoding process starts to decode the second coded area. At the time t1, the first JPEG decoding process terminates the Huffman decoding process of the first coded area. The decoded result is stored in the first common table 50. The second JPEG decoding process continues to Huffman-decode the second coded area, that is, the coded data from any location of the code sequence except the head. If a conflict takes place in the data decoded from any location of the code sequence except the head, the decoding process is re-started from a new location of the second coded area. The second JPEG decoding process repeats such a trial-and-error operation and stores the result in the second common table 500. During the time t1 to t2, the first JPEG decoding process determines whether or not a correct answer has been found in the decoded result 500 given by the second JPEG decoding process as the Huffman decoding of the second coded area is being executed. If yes, the correct answer is employed as the decoded result. At the time t2, the Huffman-decoded result of an overall picture stays in the shared memory 5. If two processors are provided as proposed by this embodiment, the i-th overall control unit (i=1 or 2) operates to properly halve all the blocks composing a picture and specify the i-th (i=1 or 2) divided portion as the object to be processed by the i-th decoding unit. In contrast to the object specified above, at the time tj to tj+1 (j=2 to 5), the i-th JPEG decoding unit operates to perform an i-th reverse quantization, an i-th IDCT, an i-th interpolation, and an i-th YUV-to-RGB conversion. Further, if n processors are provided, all the blocks which form a picture are properly divided into n parts. Then, the i-th divided portion (i=1 to n) is specified as the object to be processed by the i-th JPEG decoding unit.

Figure 15:
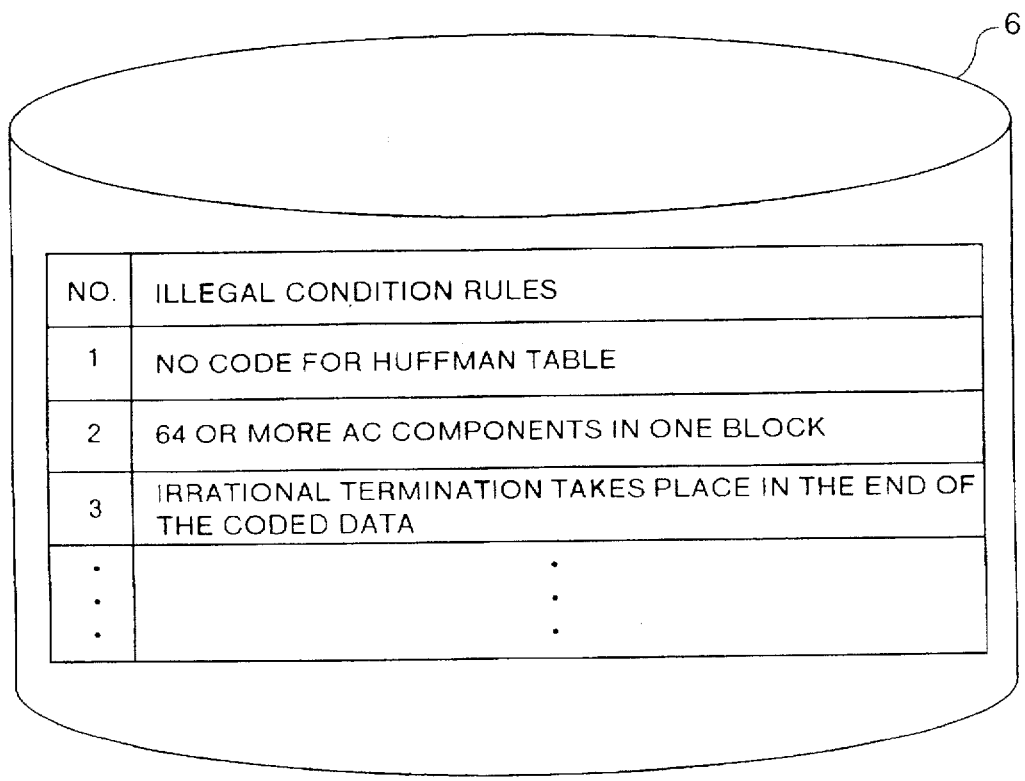
FIG. 15 is a diagram showing rules stored in an illegal condition rules storage file.

FIG. 15 shows the rules stored in the Illegal Condition rules storage file 6.

As set forth above, the decoding method and device according to this embodiment are intended to decode JPEG-coded data. The decoding system according to this invention also may be applied to other coded data like the MH, the MMR, or other variable-length Huffman coded data, which is permitted to be decoded only from the head of the code sequence.

What is claimed is:

1. A method for decoding coded data comprising the steps of:

dividing coded data into n coded areas;

decoding each of said n coded areas in parallel in first through n-th decoding processes, wherein the first decoding process operates to decode the first coded area of said n coded areas from its head, while an m-th (1<m≦n) decoding process operates in parallel with said first decoding process to decode the m-th coded area from any location of the code sequence in said m-th coded area;

storing a code delimiter representing a code point of the first coded area when a component of the first coded area is decoded in the first decoding process and storing a code delimiter representing a code point of the m-th coded area when the decoding of a component in the m-th coded area by the m-th decoding process produces a result; and comparing a code delimiter of the m-th coded area produced by said first decoding process when said first decoding process arrives at the m-th coded area, and if coincidence is detected between the code delimiters being compared, accepting decoded data.

2. A decoding method as claimed in claim 1, wherein as the m-th (1<m≦n) decoding process operates to decode coded data in the m-th coded area, if a conflict is detected in said decoded data at any location of the code sequence, the code delimiter representing the code point of that location is not stored and the m-th decoding process is restarted from a new location in the m-th coded area.

3. A device for decoding coded data comprising:

means for storing coded data as a code sequence;

first means for decoding said coded data from the head of said code sequence and for storing a code delimiter representing a code point of the component in the code sequence which is decoded;

second means operating in parallel with said first means for decoding said coded data from any start location of said code sequence except its head and for storing a code delimiter representing a code point of the component of the code sequence which is decoded;

means for determining whether or not decoded data produced by said second means is valid;

means for inhibiting the storing of a code delimiter by said second means and for re-starting the decoding process performed by said second means from a new location if said decoded data produced by said second means is determined to be not valid; and means for comparing a code delimiter stored by said first means with the code delimiters stored by said second means when said first means reaches said start location from which said second means performs decoding so as to correlate decoded data produced by said first means with decoded data produced by said second means and for indicating acceptance of the decoded data produced by said second means when a coincidence is detected between code delimiters.

4. A device for decoding coded data comprising:

means for dividing coded data representing a code sequence of components into at least first and second coded areas;

first means for decoding said coded data starting at the head of said first coded area and for storing in a first table the results of the decoding and the code point representing the location of the decoding in the code sequence;

second means, operating in parallel with said first means, for decoding said coded data starting at an arbitrary selected location in the second coded area of said code sequence and for storing in a second table the results of the decoding and the code point representing the location of the decoding in the code sequence only when the results of the decoding are valid;

means for detecting when said first means begins to decode components in the second coded area of said code sequence;

means for comparing the code point and results of decoding of a component in said second coded area by said first means with the contents of said second table after said first means begins to decode components of said coded sequence in said second coded area; and means for indicating acceptance of the results of decoding by said second means when said comparing means detects a coincidence.

5. A device for decoding coded data as claimed in claim 4, further comprising:

means for determining the validity of the results of decoding produced by said second means on the basis of stored illegal condition rules;

means for inhibiting the storing of invalid results of decoding by said second means in said second table when said determining means finds said results to be invalid; and means for restarting the decoding of said code sequence by said second means in a new location in said second coded area when the decoding of a component by said second means at a location in said second coded area produces invalid decoded results.

* * * * *